United States Patent
Kukulski et al.

(10) Patent No.: US 10,031,641 B2
(45) Date of Patent: Jul. 24, 2018

(54) ORDERING OF OBJECTS DISPLAYED BY A COMPUTING DEVICE

(75) Inventors: Timothy W. Kukulski, Oakland, CA (US); Remon Tijssen, Mill Valley (NL)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 13/339,367

(22) Filed: Dec. 28, 2011

(65) Prior Publication Data
US 2015/0199073 A1      Jul. 16, 2015

Related U.S. Application Data

(60) Provisional application No. 61/539,716, filed on Sep. 27, 2011.

(51) Int. Cl.
G06F 3/0481        (2013.01)
G06F 3/0488        (2013.01)
G06F 3/0482        (2013.01)
G06F 3/0483        (2013.01)

(52) U.S. Cl.
CPC ........ G06F 3/04817 (2013.01); G06F 3/0482 (2013.01); G06F 3/0483 (2013.01); G06F 3/0488 (2013.01)

(58) Field of Classification Search
CPC .... G06F 3/041; G06F 3/0488; G06F 3/04883; G06F 3/017; G06F 3/0481; G06F 3/033; G06F 9/542; G06F 3/04817; G06F 3/0482; G06F 3/0483; G06T 19/00; G06T 19/003; G06T 19/20
See application file for complete search history.

(56) References Cited

U.S. PATENT DOCUMENTS

| | | | |
|---|---|---|---|
| 5,124,693 A | 6/1992 | Himelstein et al. |
| 5,132,671 A | 7/1992 | Louis et al. |
| 5,301,267 A | 4/1994 | Hassett et al. |
| 5,499,366 A | 5/1996 | Rosenberg et al. |
| 5,572,639 A | 11/1996 | Gantt |
| 5,577,170 A | 11/1996 | Karow |
| 5,684,510 A | 11/1997 | Brassell et al. |
| 5,715,473 A | 2/1998 | Reed |
| 5,771,042 A | 6/1998 | Santos-Gomez |
| 5,872,566 A | 2/1999 | Bates et al. |

(Continued)

OTHER PUBLICATIONS

"Surface by Microsoft, Pre-Order the New Windows Tablet", retrieved from <http://www.microsoft.com/surface/en-US> on Oct. 17, 2012, 5 pages.

(Continued)

*Primary Examiner* — Jennifer Mehmood
*Assistant Examiner* — Sardis F Azongha
(74) *Attorney, Agent, or Firm* — Wolfe-SBMC

(57) ABSTRACT

A touch enabled graphical user interface displays a plurality of objects according to an ordering along an axis with respect to the touch enabled graphical user interface. The axis is perpendicular to the touch enabled graphical user interface. Further, a first touch input directed toward a first object in the plurality of objects and a second touch input directed toward a second object in the plurality of objects are concurrently received. In addition, a processor a processor the first object in proximity to the second object along the axis. The processor also provides a visual feedback during the repositioning.

20 Claims, 11 Drawing Sheets

(56) References Cited

U.S. PATENT DOCUMENTS

| | | |
|---|---|---|
| 5,930,408 A | 7/1999 | Seto |
| 5,943,050 A | 8/1999 | Bullock et al. |
| 5,956,736 A | 9/1999 | Hanson et al. |
| 6,005,967 A | 12/1999 | Nakagawa et al. |
| RE36,704 E | 5/2000 | Parker et al. |
| 6,377,240 B1 | 4/2002 | Baudel et al. |
| 6,469,709 B1 | 10/2002 | Sakai |
| 6,480,813 B1 | 11/2002 | Bloomquist et al. |
| 6,678,410 B1 | 1/2004 | Phinney et al. |
| 6,828,971 B2 | 12/2004 | Uesaki et al. |
| 6,959,112 B1 | 10/2005 | Wagman |
| 7,034,845 B2 | 4/2006 | Perry et al. |
| 7,058,903 B1 | 6/2006 | Jonach et al. |
| 7,136,067 B2 | 11/2006 | Stamm et al. |
| 7,222,306 B2 | 5/2007 | Kaasila et al. |
| 7,236,174 B2 | 6/2007 | Stamm et al. |
| 7,292,249 B2 | 11/2007 | Stamm et al. |
| 7,437,683 B1 | 10/2008 | Beezer et al. |
| 7,545,392 B2 | 6/2009 | Sprang et al. |
| 7,583,267 B2 | 9/2009 | Stamm et al. |
| 7,594,174 B2 | 9/2009 | Truelove et al. |
| 7,684,619 B2 | 3/2010 | Sprang et al. |
| 7,769,819 B2 | 8/2010 | Lerman et al. |
| 8,223,165 B1 | 7/2012 | Jitkoff et al. |
| 8,269,736 B2 * | 9/2012 | Wilairat ................. 345/173 |
| 8,315,473 B1 | 11/2012 | Tao et al. |
| 8,341,541 B2 * | 12/2012 | Holecek ............ G06T 15/60 345/426 |
| 8,386,956 B2 * | 2/2013 | Ording et al. .......... 715/797 |
| 8,416,243 B2 | 4/2013 | Plummer |
| 8,471,856 B2 | 6/2013 | Stamm et al. |
| 8,842,120 B2 | 9/2014 | Tijssen |
| 8,896,621 B1 | 11/2014 | Sipher et al. |
| 9,229,636 B2 | 1/2016 | Tijssen et al. |
| 9,483,167 B2 | 11/2016 | Tijssen |
| 2001/0024212 A1 | 9/2001 | Ohnishi |
| 2002/0051007 A1 | 5/2002 | Kitagawa et al. |
| 2002/0085018 A1 | 7/2002 | Chien |
| 2003/0038797 A1 | 2/2003 | Vazzana |
| 2004/0066393 A1 | 4/2004 | Cragun |
| 2004/0177323 A1 | 9/2004 | Kaasila et al. |
| 2004/0183817 A1 | 9/2004 | Kaasila |
| 2004/0261038 A1 * | 12/2004 | Ording ............ G06F 17/30994 715/757 |
| 2004/0268223 A1 | 12/2004 | Tojo |
| 2005/0012755 A1 | 1/2005 | Dresevic et al. |
| 2005/0062758 A1 | 3/2005 | Kaasila et al. |
| 2005/0162430 A1 | 7/2005 | Stamm et al. |
| 2005/0168476 A1 | 8/2005 | Levene et al. |
| 2005/0188309 A1 | 8/2005 | Tasker et al. |
| 2005/0190187 A1 | 9/2005 | Salesin et al. |
| 2005/0195221 A1 | 9/2005 | Berger et al. |
| 2005/0237342 A1 | 10/2005 | Stamm et al. |
| 2006/0017733 A1 | 1/2006 | Matskewich et al. |
| 2006/0022956 A1 | 2/2006 | Lengeling |
| 2006/0048069 A1 | 3/2006 | Igeta |
| 2006/0114258 A1 | 6/2006 | Stamm et al. |
| 2006/0149516 A1 * | 7/2006 | Bond ................. A63F 13/10 703/6 |
| 2007/0070071 A1 | 3/2007 | Terazono et al. |
| 2007/0097128 A1 | 5/2007 | Lim |
| 2007/0106929 A1 | 5/2007 | Foster et al. |
| 2007/0139413 A1 | 6/2007 | Stamm et al. |
| 2007/0139415 A1 | 6/2007 | Stamm et al. |
| 2007/0150834 A1 | 6/2007 | Muller et al. |
| 2007/0157097 A1 | 7/2007 | Peters |
| 2007/0188497 A1 | 8/2007 | Dowling et al. |
| 2007/0189708 A1 | 8/2007 | Lerman et al. |
| 2007/0216689 A1 | 9/2007 | Stamm et al. |
| 2007/0240057 A1 | 10/2007 | Satterfield et al. |
| 2007/0266319 A1 | 11/2007 | Matsuo |
| 2007/0266335 A1 | 11/2007 | Zielinski et al. |
| 2007/0268273 A1 | 11/2007 | Westerman et al. |
| 2007/0273668 A1 | 11/2007 | Park et al. |
| 2008/0012862 A1 | 1/2008 | Duggan et al. |
| 2008/0024500 A1 | 1/2008 | Bae |
| 2008/0034317 A1 | 2/2008 | Fard et al. |
| 2008/0097621 A1 | 4/2008 | Tasker et al. |
| 2008/0165193 A1 | 7/2008 | Stamm et al. |
| 2008/0229238 A1 | 9/2008 | Young |
| 2008/0238916 A1 | 10/2008 | Ghosh et al. |
| 2008/0238922 A1 | 10/2008 | Rhodes et al. |
| 2008/0244410 A1 | 10/2008 | Schormann |
| 2008/0294974 A1 | 11/2008 | Nurmi et al. |
| 2008/0301547 A1 | 12/2008 | Karunakaran et al. |
| 2009/0184980 A1 | 7/2009 | Mansfield |
| 2009/0288043 A1 | 11/2009 | Willis |
| 2009/0295826 A1 * | 12/2009 | Good et al. .................... 345/619 |
| 2009/0303178 A1 | 12/2009 | Koda et al. |
| 2010/0013862 A1 | 1/2010 | Gershfeld |
| 2010/0017101 A1 * | 1/2010 | Leone .................. G06F 3/0481 715/792 |
| 2010/0056221 A1 | 3/2010 | Park |
| 2010/0058226 A1 | 3/2010 | Flake et al. |
| 2010/0058228 A1 | 3/2010 | Park |
| 2010/0088632 A1 | 4/2010 | Knowles et al. |
| 2010/0162151 A1 * | 6/2010 | Class et al. .................... 715/765 |
| 2010/0214257 A1 | 8/2010 | Wussler et al. |
| 2010/0271404 A1 | 10/2010 | Marr |
| 2010/0278504 A1 | 11/2010 | Lyons et al. |
| 2010/0313154 A1 | 12/2010 | Choi et al. |
| 2010/0318908 A1 * | 12/2010 | Neuman et al. .............. 715/716 |
| 2011/0025719 A1 | 2/2011 | Yanase |
| 2011/0069085 A1 | 3/2011 | Weber et al. |
| 2011/0072344 A1 | 3/2011 | Harris et al. |
| 2011/0116769 A1 | 5/2011 | Suglyama et al. |
| 2011/0122159 A1 | 5/2011 | Bergsten et al. |
| 2011/0138313 A1 | 6/2011 | Decker et al. |
| 2011/0157029 A1 | 6/2011 | Tseng |
| 2011/0167349 A1 | 7/2011 | Samra et al. |
| 2011/0175821 A1 | 7/2011 | King |
| 2011/0181521 A1 * | 7/2011 | Reid et al. .................... 345/173 |
| 2011/0181617 A1 | 7/2011 | Tsuda et al. |
| 2011/0197124 A1 | 8/2011 | Garaventa |
| 2011/0197153 A1 | 8/2011 | King et al. |
| 2011/0246916 A1 | 10/2011 | Leskelä et al. |
| 2011/0302532 A1 * | 12/2011 | Missig .................... 715/823 |
| 2011/0314424 A1 | 12/2011 | Gusmorino et al. |
| 2012/0017153 A1 | 1/2012 | Matsuda et al. |
| 2012/0017163 A1 | 1/2012 | Ragan |
| 2012/0042272 A1 | 2/2012 | Hong et al. |
| 2012/0092340 A1 | 4/2012 | Sarnoff et al. |
| 2012/0110438 A1 | 5/2012 | Peraza et al. |
| 2012/0198330 A1 | 8/2012 | Koppel et al. |
| 2012/0210222 A1 | 8/2012 | Matsuda et al. |
| 2012/0313865 A1 | 12/2012 | Pearce |
| 2013/0097502 A1 | 4/2013 | Langmacher et al. |
| 2013/0127867 A1 | 5/2013 | Tijssen et al. |
| 2013/0127878 A1 | 5/2013 | Tijssen |
| 2013/0127910 A1 | 5/2013 | Tijssen et al. |
| 2013/0132878 A1 | 5/2013 | Tijssen |
| 2013/0132888 A1 | 5/2013 | Tijssen |
| 2013/0132907 A1 | 5/2013 | Kukulski et al. |
| 2013/0145268 A1 | 6/2013 | Kukulski |
| 2013/0145270 A1 | 6/2013 | Piran et al. |
| 2014/0088926 A1 | 3/2014 | Rhoades et al. |
| 2016/0110053 A1 | 4/2016 | Tijssen et al. |

OTHER PUBLICATIONS

"Non-Final Office Action", U.S. Appl. No. 13/309,924, dated (Mar. 1, 2013),19 pages.

"Non-Final Office Action", U.S. Appl. No. 13/225,203, dated (Apr. 12, 2013),12 pages.

"Final Office Action", U.S. Appl. No. 13/225,203, dated (Aug. 29, 2013),10 pages.

"Non-Final Office Action", U.S. Appl. No. 12/893,669, dated (Sep. 12, 2013),14 pages.

"Non-Final Office Action", U.S. Appl. No. 13/039,023, dated (Jul. 9, 2013),19 pages.

"Canvas Tips and Techniques: Creating a Presentation in Canvas", available at <http://www.adeptscience.co.uk/products/dataanal/canvas/tutorials/presentation.pdf>, (2002), 9 pages.

(56) References Cited

OTHER PUBLICATIONS

"The Photo Finishes Corel Draw X4 Suite", retrieved from <http://thephotofinishes.com/coreldx4.htm> on Oct. 11, 2010, 8 pages.

Bain, Steve "Cool Tricks with Paragraph Text in CorelDRAW", retrieved from <http://mc.corel.com/servlet/Satellite?c=ContentC1&cid=1158342655543&lc=en&pagename=CorelCom%2FLayout> on Jun. 18, 2010, (2010), 8 pages.

"Final Office Action", U.S. Appl. No. 13/225,203, dated Aug. 28, 2014, 16 pages.

"Non-Final Office Action", U.S. Appl. No. 12/901,799, dated Sep. 16, 2014, 16 pages.

"Final Office Action", U.S. Appl. No. 12/893,669, dated Oct. 16, 2014, 17 pages.

"SolidWorks Help—Highlighting", Retrieved from <http://help.solidworks.com/2012/English/SolidWorks/sldworks/c_Highlighting.htm> in Sep. 16, 2014, 2012, 2 pages.

"Final Office Action", U.S. Appl. No. 13/039,023, dated (Oct. 11, 2013), 22 pages.

"Final Office Action", U.S. Appl. No. 13/309,924, (Sep. 25, 2013), 17 pages.

"Fontlab Fontographer 5", *Fontlab, Ltd.*, (Jun. 2010), 525 pages.

"Non-Final Office Action", U.S. Appl. No. 12/901,799, dated (Sep. 16, 2013), 22 pages.

"Non-Final Office Action", U.S. Appl. No. 13/039,081, dated (Oct. 11, 2013), 14 pages.

"Adobe PostScript", Available at <http://www.signwarehouse.com/tech-support/manuals/Laser%20Master.pdf>, 2006, 181 pages.

"Final Office Action", U.S. Appl. No. 12/901,799, dated Feb. 7, 2014, 23 pages.

"Final Office Action", U.S. Appl. No. 13/039,081, dated Feb. 24, 2014, 16 pages.

"Non-Final Office Action", U.S. Appl. No. 12/893,669, dated Apr. 21, 2014, 15 pages.

"Non-Final Office Action", U.S. Appl. No. 13/038,871, dated Mar. 18, 2014, 14 pages.

"Non-Final Office Action", U.S. Appl. No. 13/039,023, dated Jan. 31, 2014, 33 pages.

"Non-Final Office Action", U.S. Appl. No. 13/225,203, dated Mar. 20, 2014, 12 pages.

"TrueType 1.0 Font Files", Technical Specification, Revision 1.66, Aug. 1995, 408 pages.

"Final Office Action", U.S. Appl. No. 13/038,871, dated Aug. 6, 2014, 14 pages.

"Final Office Action", U.S. Appl. No. 13/039,023, dated Jul. 3, 2014, 43 pages.

"Non-Final Office Action", U.S. Appl. No. 13/309,924, dated Jul. 3, 2014, 14 pages.

"Notice of Allowance", U.S. Appl. No. 13/039,081, dated May 15, 2014, 4 pages.

"Better editing with custom screen layouts", Retrieved from <https://digitalfilms.wordpress.com/2010/06/18/> on Jan. 30, 2015, Jun. 18, 2010, 7 pages.

"Final Office Action", U.S. Appl. No. 12/901,799, dated Mar. 25, 2015, 18 pages.

"Final Office Action", U.S. Appl. No. 13/309,924, dated Jan. 29, 2015, 16 pages.

"Non-Final Office Action", U.S. Appl. No. 12/893,669, dated Mar. 25, 2015, 20 pages.

"Non-Final Office Action", U.S. Appl. No. 13/038,871, dated Mar. 17, 2015, 11 pages.

Hauptmann, et al., "Artificial Intelligence Techniques in the Interface to a Digital Video Library", CHI '97 Extended Abstracts on Human Factors in Computing Systems, Mar. 1997, 6 pages.

St. et al., "Characterizing Tool Use in an Interactive Drawing Environment", SmartGraphics, Proceedings of the 2nd International Symposium on Smart Graphics, 2002, 8 pages.

"Notice of Allowance", U.S. Appl. No. 13/038,871, dated Aug. 24, 2015, 15 pages.

"Final Office Action", U.S. Appl. No. 12/893,669, dated Aug. 11, 2015, 17 pages.

"Notice of Allowance", U.S. Appl. No. 12/893,669, dated Jul. 29, 2016, 7 pages.

"Restriction Requirement", U.S. Appl. No. 14/945,107, dated Mar. 14, 2018, 6 pages.

\* cited by examiner

ORDERING OF OBJECTS DISPLAYED BY A COMPUTING DEVICE

RELATED APPLICATIONS

This application claims priority to U.S. Provisional Patent Application No. 61/539,716, entitled "Ordering of Objects Displayed by a Computing Device," filed on Sep. 27, 2011, which is hereby incorporated by reference in its entirety.

BACKGROUND

1. Field

This disclosure generally relates to computing devices. More particularly, the disclosure relates to ordering of objects displayed by a touch enabled device.

2. General Background

Some current touch-enabled devices display objects according to various layers. For example, a user may drag an object so that object, or a portion of that object, is displayed in front of layers of other objects. However, current touch-enabled configurations provide little maneuverability amongst such objects to a user. For example, a user may view a stack of objects and wish to reorder the stack such that the last object is the second to last object. Current configurations do not provide such functionality. Current configurations only allow a user to drag and object from the stack, which results in the object being moved to the top of the stack. Further, a drag has to be performed as a tap gesture does not result in any movement of objects within the stack.

SUMMARY

In one aspect of the disclosure, a touch enabled device is provided. The touch enabled device includes a touch enabled graphical user interface that displays a plurality of objects according to an ordering along an axis with respect to the touch enabled graphical user interface. Further, the touch enabled device includes an input module that receives a first touch input directed toward a first object in the plurality of objects and a second touch input directed toward a second object in the plurality of objects. In addition, the touch enabled device includes a processor that repositions the first object in proximity to the second object along the axis.

In another aspect of the disclosure, a computer program product is provided. The computer program product includes a computer useable medium having a computer readable program. The computer readable program when executed on a computer causes the computer to display a plurality of objects according to an ordering along an axis with respect to the touch enabled graphical user interface. Further, the computer readable program when executed on the computer causes the computer to receive a first touch input directed toward a first object in the plurality of objects and a second touch input directed toward a second object in the plurality of objects. In addition, the computer readable program when executed on the computer causes the computer to reposition the first object in proximity to the second object along the axis. The computer readable program when executed on the computer also causes the computer to provide a visual feedback during the repositioning.

In yet another aspect of the disclosure, a process is provided. The process displays, with a touch enabled graphical user interface, a plurality of objects according to an ordering along an axis with respect to the touch enabled graphical user interface, the axis being perpendicular to the touch enabled graphical user interface. Further, the process concurrently receives, with an input module, a first touch input directed toward a first object in the plurality of objects and a second touch input directed toward a second object in the plurality of objects. In addition, the process repositions, with a processor, the first object in proximity to the second object along the axis. The process also provides, with the processor, a visual feedback during the repositioning.

DRAWINGS

The above-mentioned features of the present disclosure will become more apparent with reference to the following description taken in conjunction with the accompanying drawings wherein like reference numerals denote like elements and in which:

FIG. 2A illustrates an example in which the user provides touch inputs to move the fifth object in proximity to the third object.

FIG. 2B illustrates an example of a visual feedback of the repositioning illustrated in FIG. 1.

FIG. 2C illustrates the repositioning of the fifth object.

FIG. 2D illustrates the reordered stack.

Figure 2A:
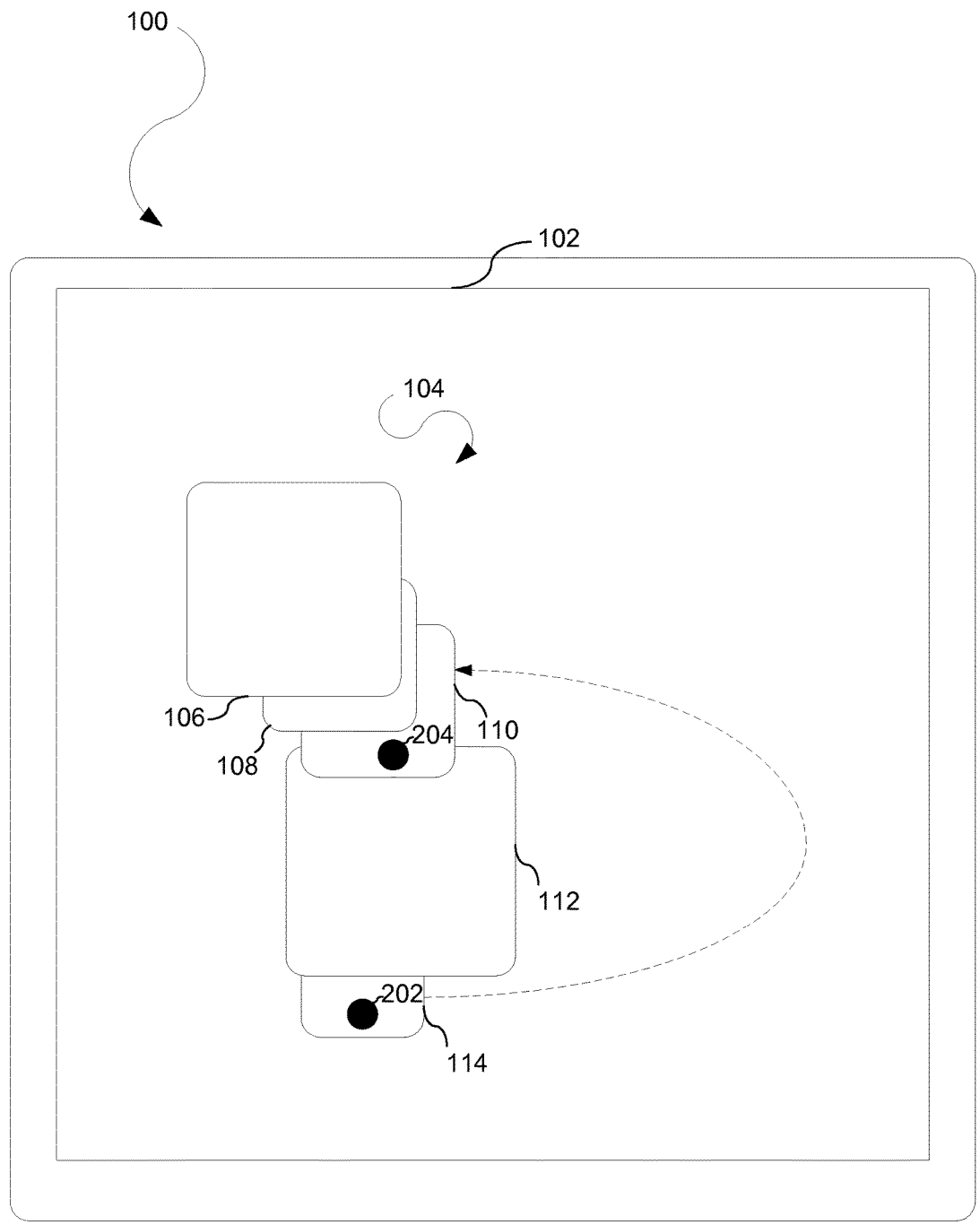
FIGS. 2A-2E illustrate examples reordering of the plurality of objects illustrated in FIG. 1.
Figure 2B:
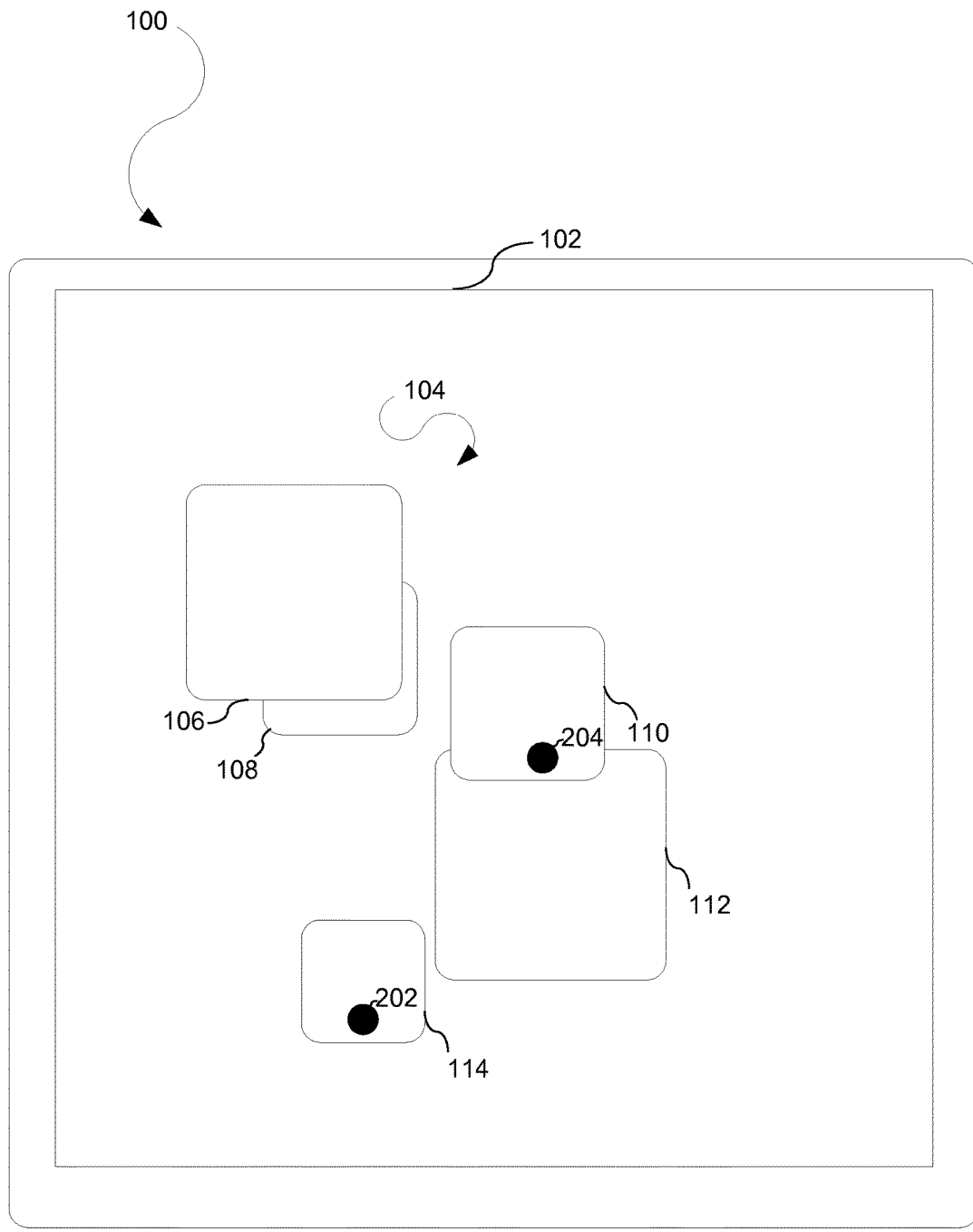
Figure 2C:
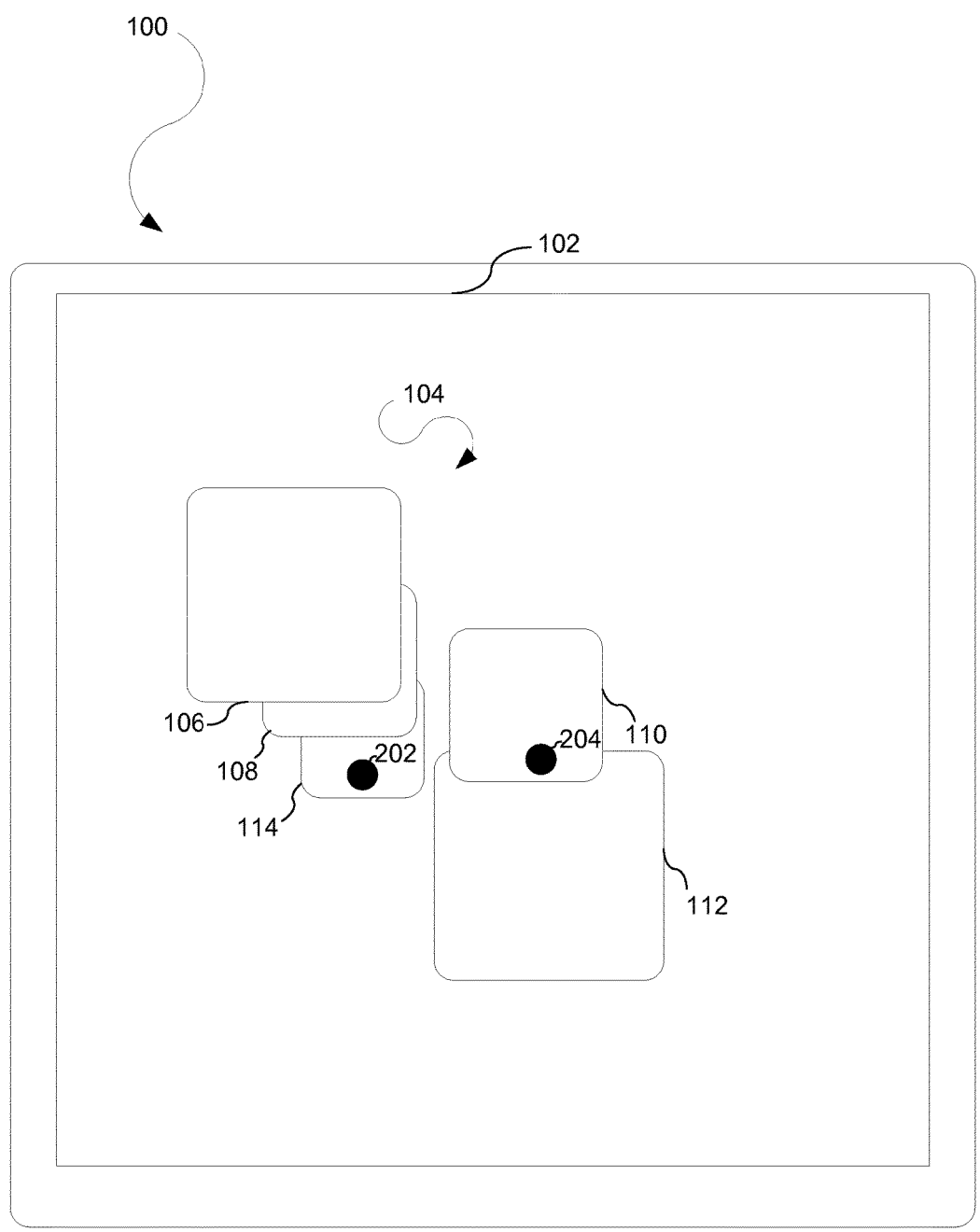
Figure 2D:
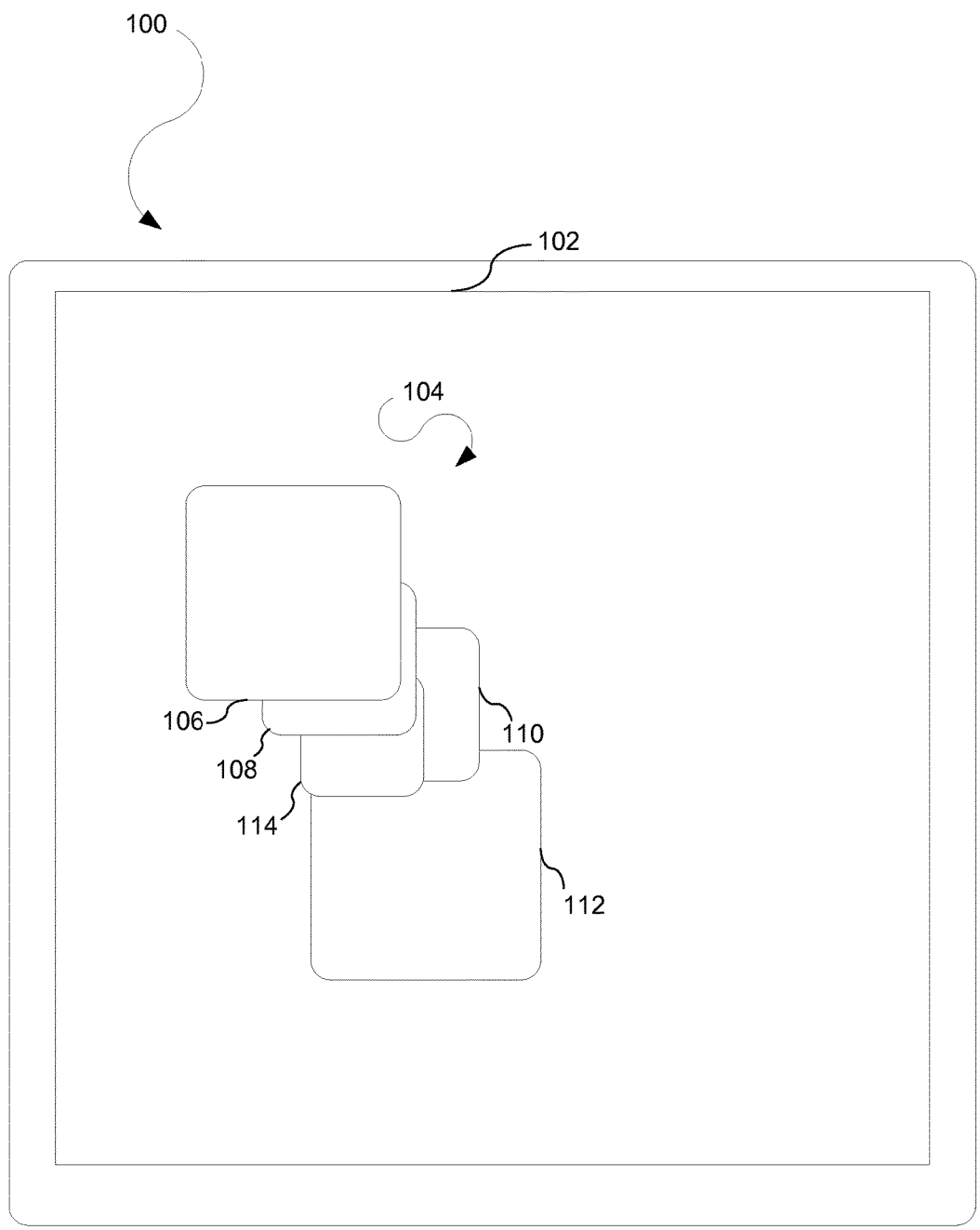
Figure 2E:
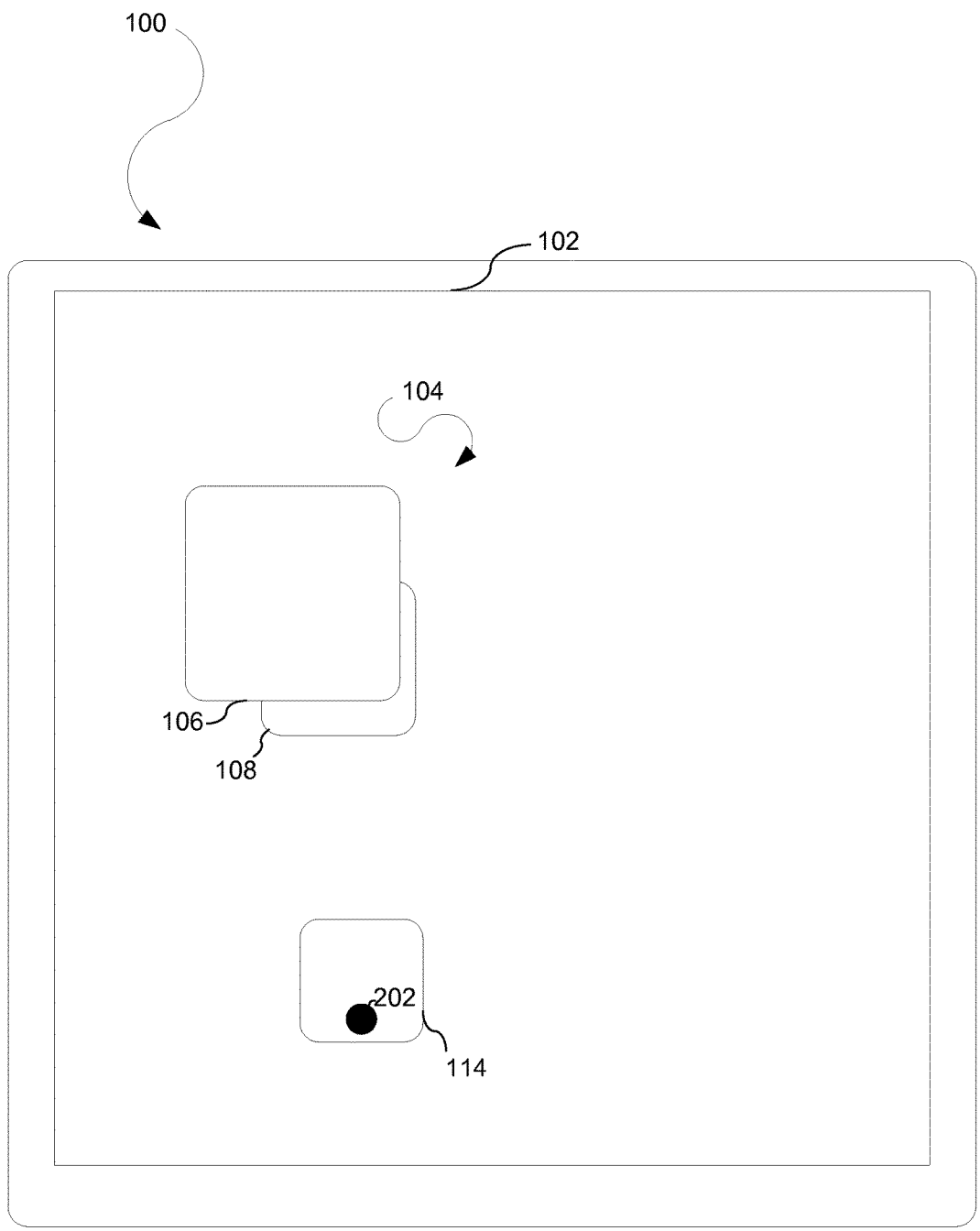

As an alternative to the visual feedback of FIG. 2B, FIG. 2E illustrates a cross fading configuration.

Figure 1:
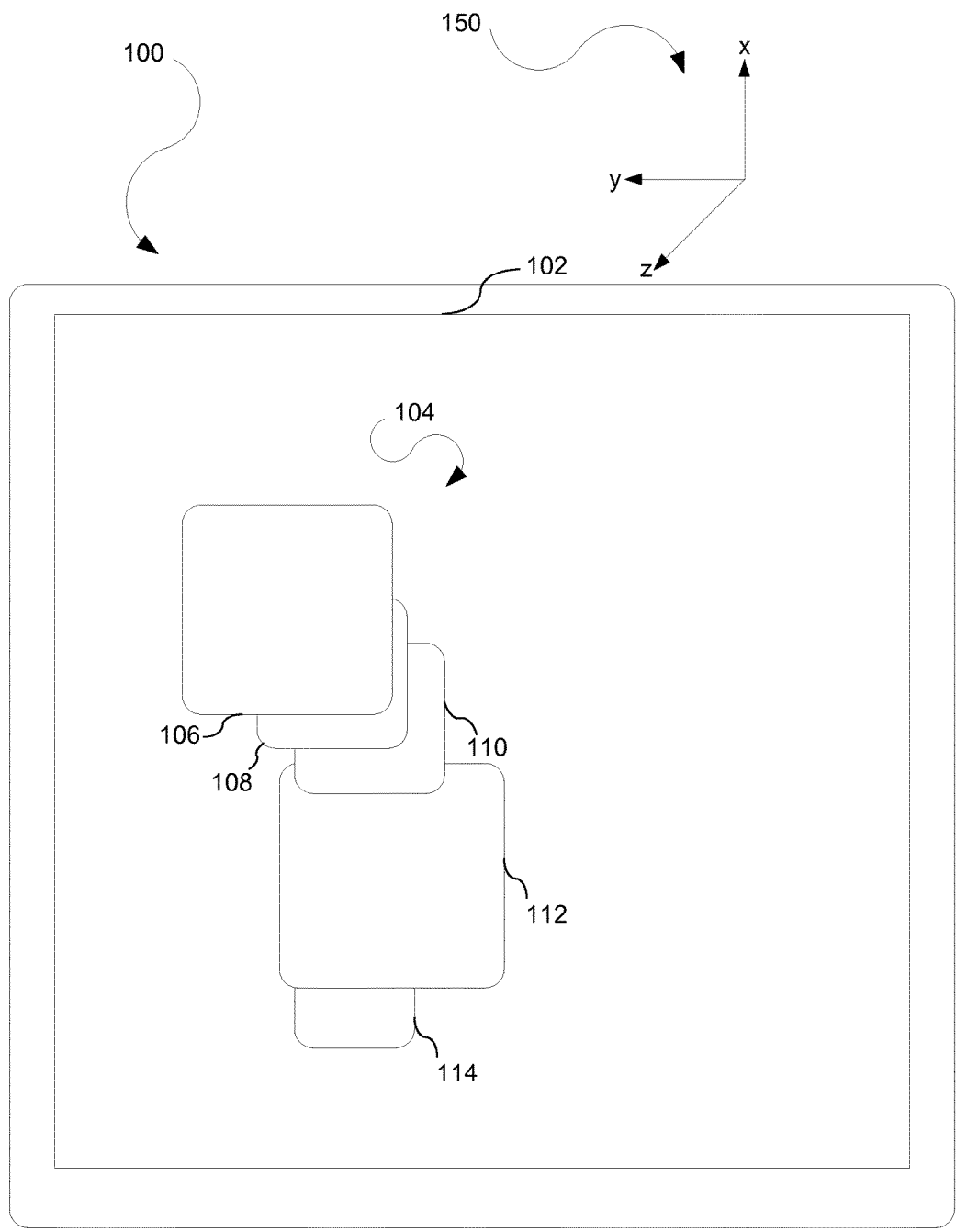
FIG. 1 illustrates a touch enabled device that has a touch enabled device graphical user interface ("GUI").
Figure 3A:
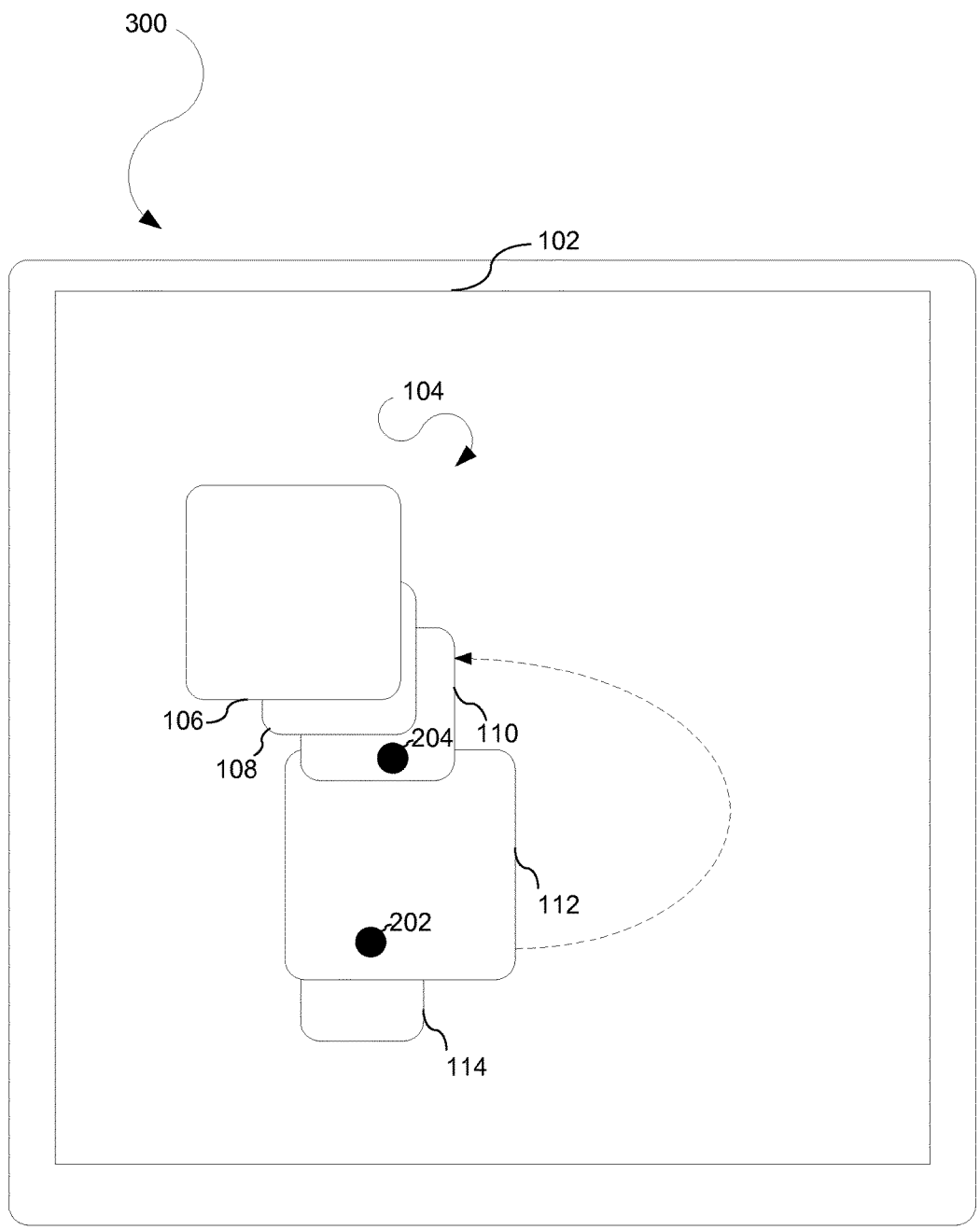
Figure 3B:
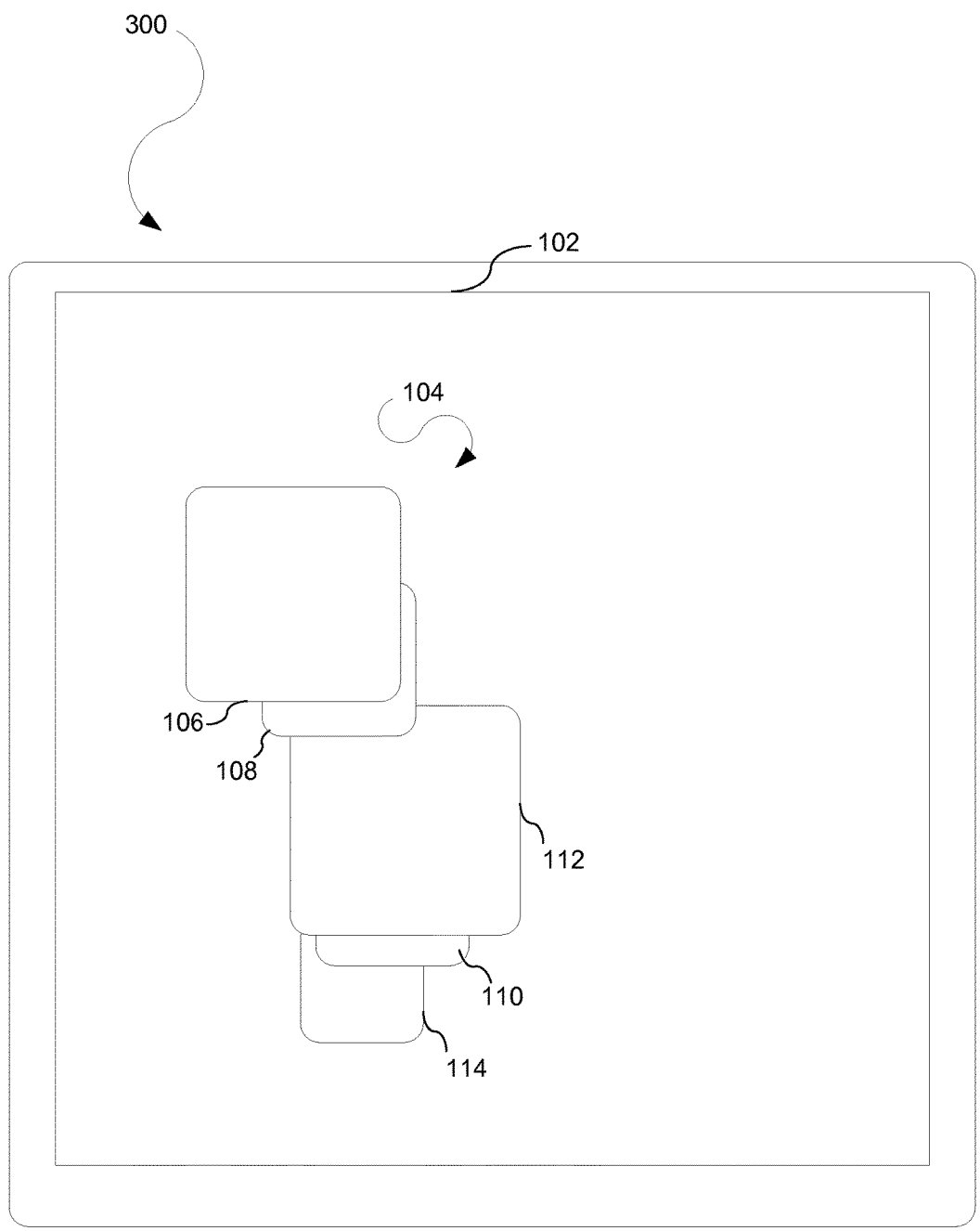

FIGS. 3A and 3B illustrate examples reordering of the plurality of objects 104 illustrated in FIG. 1.

FIG. 3A illustrates a first touch input indicating the fourth object and a second touch input third object.

Accordingly, FIG. 3B illustrates a reordered stack with swapping and without any sliding or cross-fading.

Figure 4:
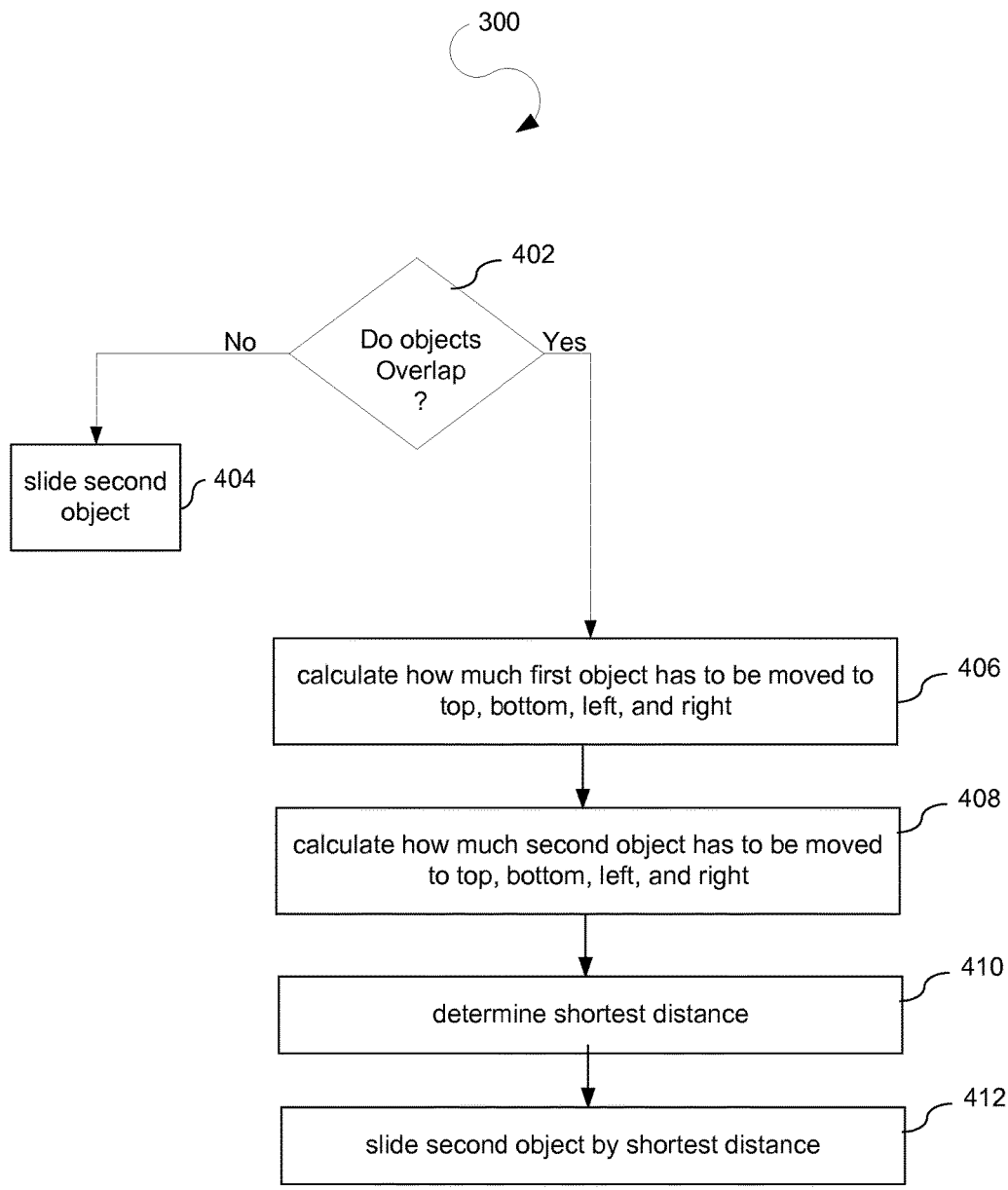

FIG. 4 illustrates the process that may be utilized to calculate the distances that intervening objects should slide if objects overlap during a repositioning.

Figure 5:
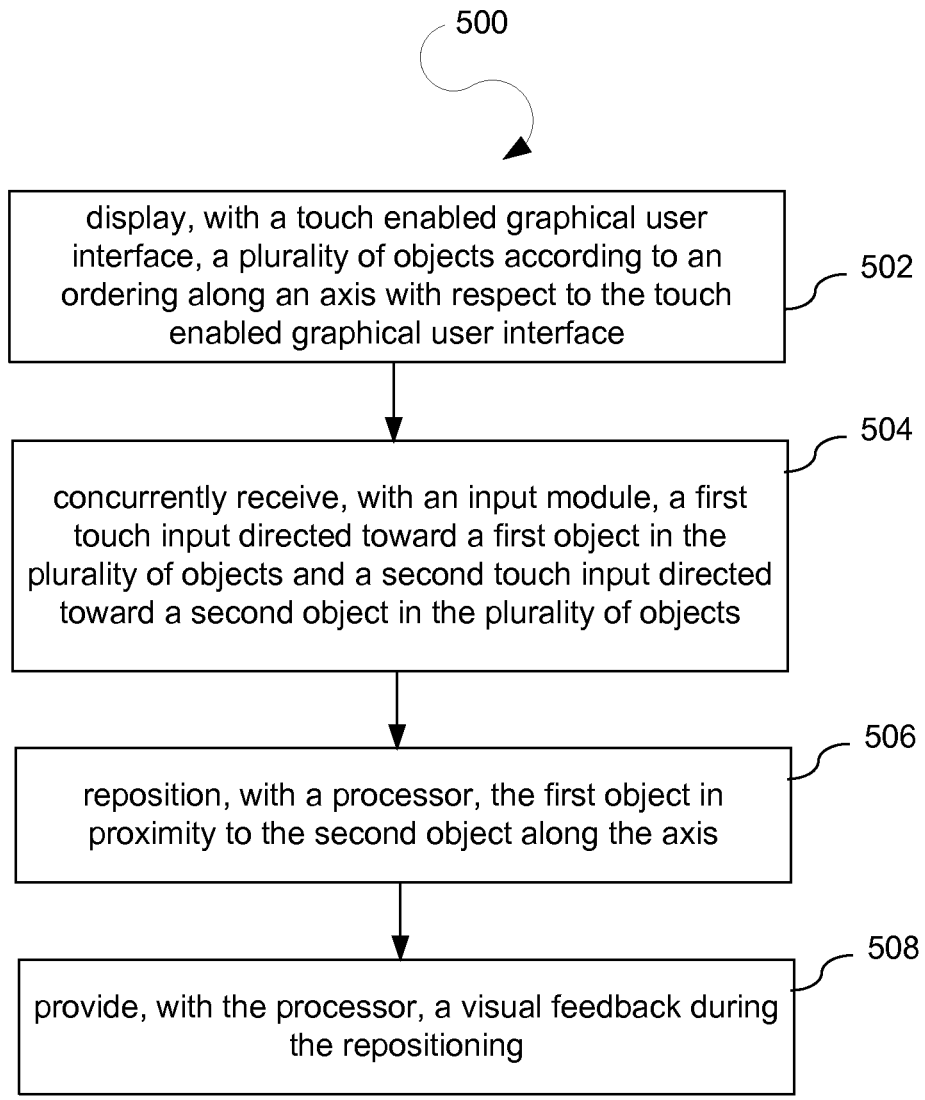

FIG. 5 illustrates a process that may be utilized to perform ordering of a plurality of objects displayed in a touch enabled GUI of a touch enabled device.

Figure 6:
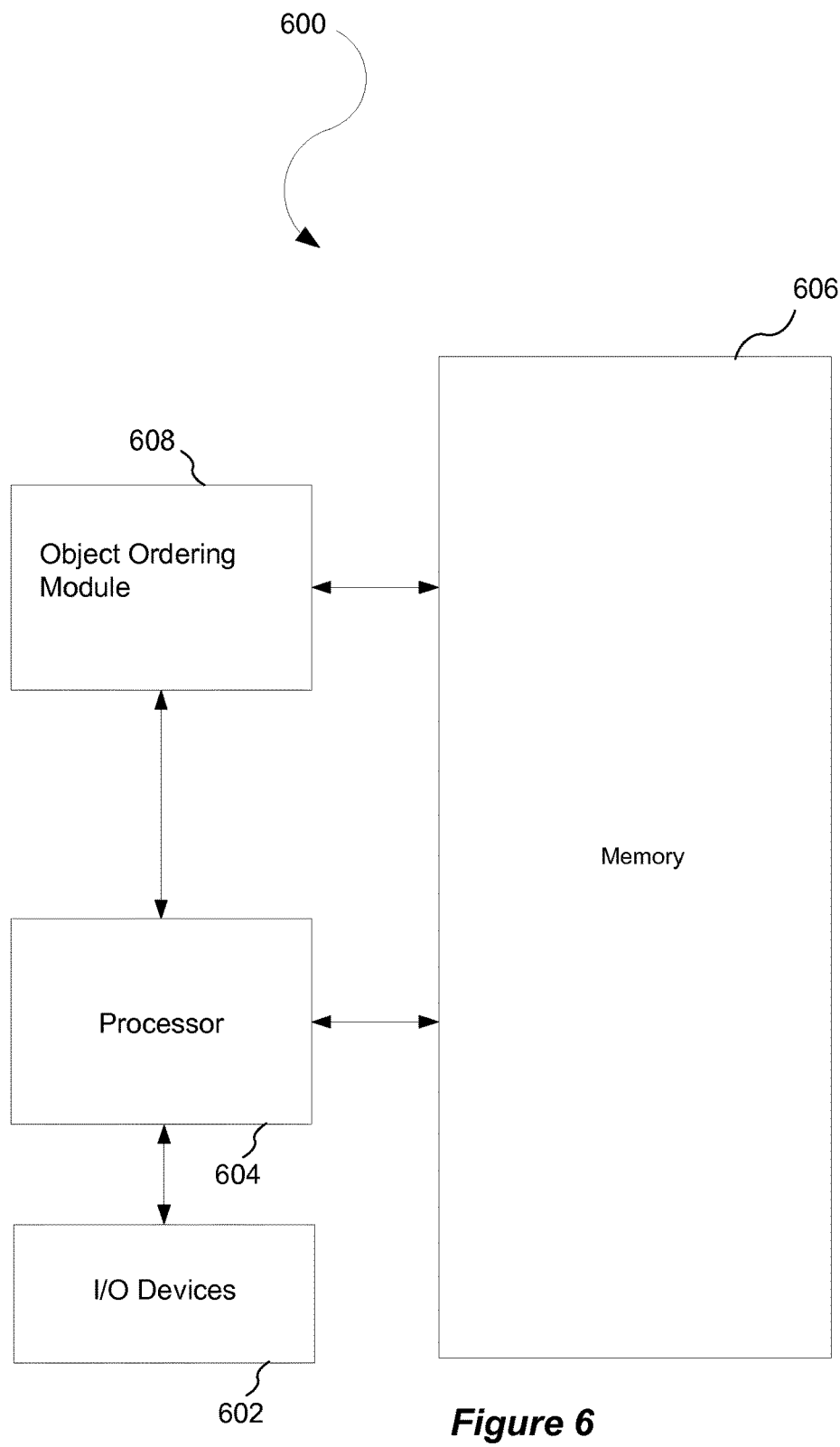

FIG. 6 illustrates a system configuration that may be utilized to provide an ordering of a displayed plurality of objects.

DETAILED DESCRIPTION

A reordering configuration for a plurality of objects is provided. The reordering configuration may be utilized to reorder objects at arbitrary positions in a stack. Further, in one embodiment, a visual feedback is provided to depict what is happening to objects as objects are repositioned. The reordering configuration may be utilized to manipulate a display to clearly indicate the intention of the user with respect to reordering objects in a stack of objects. In contrast with a configuration that simply moves an object to the top of the stack, the reordering configuration allows a user to indicate particular position in the stack to which an object is moved. A reference object in the stack is designated so that the user may move an object with respect to that reference object. Further, the visual feedback displays the effect on the other objects during the process of repositioning an object. The visual feedback may provide the appearance of a natural reordering of objects. Accordingly, the user may have more a natural interactivity with a computing device than a configuration that simply moves an object to the top of the stack.

The computing device may be a touch enabled device or a non-touch enabled device. The touch enabled device may be any computing device such as a tablet device, smart phone, personal computer ("PC"), laptop, or the like that allows a user to perform operations in the touch enabled device GUI by touching the GUI with one or more fingers, a stylus, or the like. The object may be a media object, a text object, a video object, an audio object, a graphics object, an interactive object, or the like. Further, the non-touch enabled device may be any computing device such as a tablet device, smart phone, PC, laptop, or the like that receives any type of non-touch input.

The configurations provided for herein allow a user to have full control over the positioning of objects within a stack. As an example, with respect to a touch enabled device, a user may utilize various touch inputs concurrently to provide precise inputs to move objects within the stack. The user may utilize multiple hands, multiple fingers, multiple styluses, a combination of hand and a stylus, a combination of a finger and a stylus, or the like to provide touch inputs to indicate the reordering of objects within a stack.

FIG. 1 illustrates a touch enabled device 100 that has a touch enabled device GUI 102. The touch enabled device GUI 102 displays a plurality of objects 104. As an example, the plurality of objects may include a first object 106, a second object 108, a third object 110, a fourth object 112, and a fifth object 114. These objects are provided merely as examples for illustrative purposes. The objects may be different sizes, shapes, etc. As an example, the objects are displayed according to an order of the first object 106 being on top, the second object 108 being beneath the first object 106, the third object 110 being beneath the first object 106 and the second object 108, the fourth object 112 being beneath the first object 106, the second object 108, and the third object 110, and the fifth object 114 being beneath the first object 106, the second object 108, the third object 110, and the fourth object 112.

In one embodiment, the order of the objects is measured according to an axis of the touch enabled device GUI 102. A coordinate system 150 is illustrated for reference. The coordinate system 150 may include axes such as an x-axis, a y-axis, and a z-axis. For example, the order may be measured along the z-axis. As another example, the order may be measured along an axis perpendicular to the touch enabled device GUI 102. The coordinate system 150 may or may not be illustrated in the touch enabled device GUI 102 for reference by the user.

FIGS. 2A-2E illustrate examples reordering of the plurality of objects 104 illustrated in FIG. 1. FIG. 2A illustrates an example in which the user provides touch inputs to move the fifth object 114 in proximity to the third object 110, which is the reference object. The term proximity is intended herein to refer to adjacent, on top of, below, or the like. Further, two objects may be in proximity if they touch or if they are substantially close to touching. For instance, the user may wish to move the fifth object 114 to a position on top of the third object 110. The user may provide various forms of touch inputs that are each associated with various commands. For example, a first touch input 202 may be a tap and drag gesture that is performed concurrently with a second touch input 204 that may be a tap gesture. The tap and drag gesture indicates the object that is being moved. Further, the tap gesture indicates the reference object to which the other object is being moved toward. The user may tap and let go of the reference object. In another embodiment, the user has to tap and hold the reference object during the repositioning of the other object toward the reference object. In yet another embodiment, a tap is utilized to indicate the reference object and a tap and hold is utilized to change the order between the object being moved and the reference object, e.g., switch the reference object to in front of or behind the object that is moved. Various other gestures may be utilized. For example, the first touch input 202 may be an initial tap and hold and the second touch input 204 may be a subsequent tap and hold. Such gestures may be performed concurrently or separately such that a first touch input is recorded and can be removed after which a second touch input may be recorded and removed.

FIG. 2B illustrates an example of a visual feedback of the repositioning illustrated in FIG. 1. In one embodiment, the visual feedback is a display of movement of overlapping objects that would have to be moved out of the way if the objects had to be moved on a desk. For instance, the third object 110 and the fourth object 112 may be moved sideways to allow the fifth object 114 to move directly upwards without any objects in the way. The third object 110 and the fourth object 112 may then be moved back the fifth object 114 has been moved. In other words, when reordering an object along the z-axis, objects are moved along the x-y plane so that those objects do not interfere with the object that is moved. In one embodiment, calculations are performed to determine the distance that the objects should be moved. FIG. 4 illustrates an example of a process 400 that may be utilized to perform such calculations. The process 400 is only an example as other processes may be utilized to perform the calculations. FIG. 2C illustrates the repositioning of the fifth object 114. The fifth object 114 is now beneath the first object 106 and the second object 108. FIG. 2D illustrates the reordered stack. As an example, the objects are displayed according to an order of the first object 106 being on top, the second object 108 being beneath the first object 106, the fifth object 114 being beneath the first object 106 and the second object 108, the fourth object 112 being beneath the first object 106, the second object 108, and the fifth object 114, and the third object 112 being beneath the first object 106, the second object 108, the fifth object 114, and the fourth object 110. As an alternative to the visual feedback of FIG. 2B, FIG. 2E illustrates a cross fading configuration. As an example, the second object 108 moves from behind to in front of the first object 106. At the end of a transition region 205, a corresponding region of the object 108 is displayed. A smoothly varying cross-fade may be displayed between the start-state image and the end-state image in the transition region 205. The transition may be linear or may follow an easing function such an ease-in-ease-out.

In one embodiment, a user command to move a first object toward a second object indicates that the first object should be positioned above the second object. As an example, a user may indicate the first object with a first tap and a second object with a second tap. The user may drag the first object after the first tap. The drag may be a tap and hold drag or a tap, release, and drag. Accordingly, the first tapped object is the object that moves and the second tapped object is the object that is the reference object. In another embodiment, a user command to move a first object toward a second object indicates that the first object should be positioned under the first object. As an example, a user may indicate the first object with a first tap and a second object with a second tap. The user may drag the first object after the first tap. The drag may be a tap and hold drag or a tap, release, and drag. Accordingly, the first tapped object is the object that moves and the second tapped object is the object that is the reference object. The configurations may be customized by the user to provide commands that are suitable for the user.

In yet another embodiment, a user command to move a second object towards a first object indicates that the first object should be positioned above the second object. As an example, a user may indicate the first object with a first tap and a second object with a second tap. Accordingly, the first tapped object is the reference object and the second tapped object is the object that moves. In another embodiment, a user command to move a second object towards a first object indicates that the first object should be positioned under the second object. As an example, a user may indicate the first object with a first tap and a second object with a second tap. Accordingly, the first tapped object is the reference object and the second tapped object is the object that moves. The configurations may be customized by the user to provide commands that are suitable for the user.

FIGS. 3A and 3B illustrate examples reordering of the plurality of objects 104 illustrated in FIG. 1. FIG. 3A illustrates a first touch input indicating the fourth object 112 and a second touch input third object 110. Since there are no intervening overlapping objects, these objects may be swapped. Accordingly, FIG. 3B illustrates a reordered stack with swapping and without any sliding or cross-fading.

FIG. 4 illustrates the process 400 that may be utilized to calculate the distances that intervening objects should slide if objects overlap during a repositioning. As an example, the process 400 is based on calculating the minimum distance. At a decision block, 402, the process 400 determines if the objects overlap. If the objects do not overlap, the objects may simply be swapped or moved at a process block 404. In one embodiment, an offset is utilized. In another embodiment, an offset is not utilized. If, at the decision block 402, the process 400 determines that an overlap exists, the process 400 advances to a process block 406 to calculate how much the first object has to be moved to the top, bottom, left, and right to avoid an overlap. The process 400 then moves to a process block 408 to calculate how much the second object has to be moved to the top, bottom, left, and right to avoid an overlap. Further, the process moves to the process block 410 to determine the shortest distance. As the first object is not being moved to avoid an overlap, reverse of the calculations performed for the first object are calculated. Out of those calculations and the distances for the second object, which does move to avoid an overlap, the shortest distance is calculated. At a process block 412, the process 400 slides the second object by the shortest distance to avoid the overlap. In another embodiment, the process 400 may provide optimal results for a convex polygon by iterating the polygon's sides instead of utilizing the shorthand for a rectangle's top, bottom, left, and right.

Although examples of two objects in a plurality of objects are utilized more than two objects may be manipulated. For example, a user may potentially utilize more than two fingers to move two or more objects with respect to another reference object. In one embodiment, if two are more objects are moved simultaneously, their relative ordering is not changed. For example, if the initial order of objects A, B, C, D, E, and F is ABCDEF and DEF are moved in front of B, the resulting order would be ADEFBC.

Further, although examples of touch enabled devices are illustrated, non-touch enabled devices may also be utilized. For example, a PC may be operably connected to a keyboard with a modifier key so that a user may utilize a computer mouse to point to a reference object, designate that object with the modifier key, and then move the mouse pointer to another object to be moved with respect to the reference object by utilizing a computer mouse button.

FIG. 5 illustrates a process 500 that may be utilized to perform ordering of a plurality of objects displayed in a touch enabled GUI of a touch enabled device. At a process block 502, the process 500 displays, with a touch enabled graphical user interface, a plurality of objects according to an ordering along an axis with respect to the touch enabled graphical user interface. In one embodiment, the axis may be perpendicular to the touch enabled graphical user interface. Further, at a process block 504, the process 500 concurrently receives, with an input module, a first touch input directed toward a first object in the plurality of objects and a second touch input directed toward a second object in the plurality of objects. In another embodiment, the first touch input and the second touch input are not concurrently received. As an example, a first tap indicating a first object followed by a subsequent tap indicating a second object may be received. In addition, at a process block 506, the process 500 repositions, with a processor, the first object in proximity to the second object along the axis. At a process block 508, the process 500 also provides, with the processor, a visual feedback during the repositioning. In an alternative embodiment, the ordering may be performed without the visual feedback.

FIG. 6 illustrates a system configuration 600 that may be utilized to provide an ordering of a displayed plurality of objects. In one embodiment, an object ordering module 608 interacts with a memory 606 to provide a reordering of objects displayed by a touch enabled device GUI. In one embodiment, the system configuration 600 is suitable for storing and/or executing program code and is implemented using a general purpose computer or any other hardware equivalents. The processor 604 is coupled, either directly or indirectly, to the memory 606 through a system bus. The memory 606 can include local memory employed during actual execution of the program code, bulk storage, and/or cache memories which provide temporary storage of at least some program code in order to reduce the number of times code must be retrieved from bulk storage during execution.

The Input/Output ("I/O") devices 602 can be coupled directly to the system configuration 500 or through intervening input/output controllers. Further, the I/O devices 502 may include a keyboard, a keypad, a mouse, a microphone for capturing speech commands, a pointing device, and other user input devices that will be recognized by one of ordinary skill in the art. Further, the I/O devices 602 may include output devices such as a printer, display screen, or the like. Further, the I/O devices 602 may include a receiver, transmitter, speaker, display, image capture sensor, biometric sensor, etc. In addition, the I/O devices 602 may include storage devices such as a tape drive, floppy drive, hard disk drive, compact disk ("CD") drive, etc.

Network adapters may also be coupled to the system configuration 600 to enable the system configuration 600 to become coupled to other systems, remote printers, or storage devices through intervening private or public networks. Modems, cable modems, and Ethernet cards are just a few of the currently available types of network adapters. The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the computer program products, processes, and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the computer program products, processes, and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A touch-enabled device comprising:
   a touch-enabled graphical user interface that displays a plurality of objects according to an ordering along an axis with respect to the touch-enabled graphical user interface, the axis being perpendicular to the touch-enabled graphical user interface;
   an input module that receives a first touch input directed toward a first object in the plurality of objects and a second touch input directed toward a second object in the plurality of objects; and
   a processor that repositions the first object in proximity to the second object along the axis, the repositioning changing the ordering of the plurality of objects along the axis responsive to the first touch input and the second touch input,
   wherein the processor further provides a visual feedback during the repositioning that includes, if the first object overlaps any additional objects between the first object and the second object, displaying on the touch-enabled graphical user interface:
      a shift of the additional objects away from a path of travel to be taken by the first object to be in proximity to the second object;
      a movement of the first object along the path of travel to be in proximity to the second object; and
      a shift back of the additional objects.

2. The touch-enabled device of claim 1, wherein the first touch input is a tap and drag gesture and the second touch input is a tap and hold gesture.

3. The touch-enabled device of claim 2, wherein the tap and drag gesture indicates the proximity to the second object.

4. The touch-enabled device of claim 1, wherein the axis is a z-axis.

5. The touch-enabled device of claim 1, wherein the processor calculates the smallest possible displacement of any overlapping additional objects to determine a distance for the shift of the overlapping additional objects.

6. The touch-enabled device of claim 1, wherein the displaying on the touch-enabled graphical user interface further includes a shift of the second object away from the path of travel and a shift back of the second object after the first object is moved along the path of travel, if the first object overlaps the second object.

7. The touch-enabled device of claim 1, wherein the touch-enabled graphical user interface provides to a user unrestricted planar positioning of the plurality of objects and displays the first object and the second object at positions that are unrestricted by a predetermined pattern.

8. The touch-enabled device of claim 1, wherein the touch-enabled graphical user interface displays a coordinate system comprising a plurality of axes including at least the axis used to display the plurality of objects according to the ordering.

9. The touch-enabled device of claim 1, wherein the input module receives the first touch input directed toward the first object after the second touch input directed toward the second object.

10. The touch-enabled device of claim 1, wherein:
    the plurality of objects comprises multiple objects, the multiple objects including the first object;
    the input module receives a multiple touch input directed toward the multiple objects, the multiple touch input including the first touch input; and
    the processor repositions the multiple objects in proximity to the second object along the axis, the repositioning changing the ordering of the plurality of objects along the axis responsive to the multiple touch input and the second touch input,
    wherein the processor further provides a visual feedback during the repositioning that includes, if the multiple objects overlap any additional objects between the multiple objects and the second object, displaying on the touch-enabled graphical user interface:
       a shift of the additional objects away from a path of travel to be taken by the multiple objects to be in proximity to the second object;
       a movement of the multiple objects along the path of travel to be in proximity to the second object; and
       a shift back of the additional objects.

11. The touch-enabled device of claim 10, wherein the multiple objects have a relative ordering for individual objects of the multiple objects, and the relative ordering is unchanged by the movement of the multiple objects.

12. A computer program product comprising a computer-useable hardware memory storing a computer-readable program, the computer-readable program responsive to execution on a computer causes the computer to:
    display a plurality of objects according to an ordering along an axis with respect to a touch-enabled graphical user interface, the axis being perpendicular to the touch-enabled graphical user interface;
    receive a first touch input directed toward a first object in the plurality of objects and a second touch input directed toward a second object in the plurality of objects;
    reposition the first object in proximity to the second object along the axis, the repositioning changing the ordering of the plurality of objects along the axis responsive to the first touch input and the second touch input; and
    provide a visual feedback during the repositioning that includes, if the first object overlaps any additional objects between the first object and the second object, displaying on the touch-enabled graphical user interface:

a shift of the additional objects away from a path of travel to be taken by the first object to be in proximity to the second object;
a movement of the first object along the path of travel to be in proximity to the second object; and
a shift back of the additional objects.

13. The computer program product of claim 12, wherein the computer is selected from a touch-enabled tablet device, a touch-enabled desktop computer, or a touch-enabled smartphone.

14. The computer program product of claim 12, wherein the computer-readable program responsive to execution on the computer further causes the computer to:
provide to a user unrestricted planar positioning of the plurality of objects with the touch-enabled graphical user interface; and
display the first object and the second object at positions that are unrestricted by a predetermined pattern.

15. The computer program product of claim 12, wherein the plurality of objects comprises multiple objects that include the first object, and the computer-readable program responsive to execution on the computer further causes the computer to:
receive a multiple touch input directed toward the multiple objects, the multiple touch input including the first touch input;
reposition the multiple objects in proximity to the second object along the axis, the repositioning changing the ordering of the plurality of objects along the axis responsive to the multiple touch input and the second touch input; and
provide a visual feedback during the repositioning that includes, if the multiple objects overlap any additional objects between the multiple objects and the second object, displaying on the touch-enabled graphical user interface:
a shift of the additional objects away from a path of travel to be taken by the multiple objects to be in proximity to the second object;
a movement of the multiple objects along the path of travel to be in proximity to the second object such that a relative ordering for individual objects of the multiple objects is unchanged by the movement of the multiple objects; and
a shift back of the additional objects.

16. The computer program product of claim 12, wherein the first object in proximity to the second object along the axis comprises the first object being adjacent to the second object along the axis.

17. A method comprising:
displaying with a touch-enabled graphical user interface a plurality of objects according to an ordering along an axis with respect to the touch-enabled graphical user interface, the axis being perpendicular to the touch-enabled graphical user interface;
receiving, with an input module, a first touch input directed toward a first object in the plurality of objects and a second touch input directed toward a second object in the plurality of objects;
repositioning, with a processor, the first object in proximity to the second object along the axis, the repositioning changing the ordering of the plurality of objects along the axis responsive to the first touch input and the second touch input; and
providing, with the processor, a visual feedback during the repositioning that includes, if the first object overlaps any additional objects between the first object and the second object, displaying on the touch-enabled graphical user interface:
a shift of the additional objects away from a path of travel to be taken by the first object to be in proximity to the second object;
a movement of the first object along the path of travel to be in proximity to the second object; and
a shift back of the additional objects.

18. The method of claim 17, wherein the plurality of objects comprises multiple objects that are shaped and sized differently from each other.

19. The method of claim 17, wherein the displaying comprises:
providing to a user unrestricted planar positioning of the plurality of objects with the touch-enabled graphical user interface; and
displaying the first object and the second object at positions that are unrestricted by a predetermined pattern.

20. The method of claim 17, wherein:
the plurality of objects comprises multiple objects, the multiple objects including the first object;
the receiving comprises receiving, with the input module, a multiple touch input directed toward the multiple objects, the multiple touch input including the first touch input;
the repositioning comprises repositioning, with the processor, the multiple objects in proximity to the second object along the axis, the repositioning changing the ordering of the plurality of objects along the axis responsive to the multiple touch input and the second touch input; and
the providing comprises providing, with the processor, a visual feedback during the repositioning that includes, if the multiple objects overlap any additional objects between the multiple objects and the second object, displaying on the touch-enabled graphical user interface:
a shift of the additional objects away from a path of travel to be taken by the multiple objects to be in proximity to the second object;
a movement of the multiple objects along the path of travel to be in proximity to the second object such that a relative ordering for individual objects of the multiple objects is unchanged by the movement of the multiple objects; and
a shift back of the additional objects.

* * * * *